(12) United States Patent
Hamilton

(10) Patent No.: US 8,382,040 B2
(45) Date of Patent: Feb. 26, 2013

(54) HAMILTON H.N2 LAMINAR FLOW DISKETTE WING

(76) Inventor: Terry Wayne Hamilton, Bulverde, TX (US)

( * ) Notice: Subject to any disclaimer, the term of this patent is extended or adjusted under 35 U.S.C. 154(b) by 204 days.

(21) Appl. No.: 12/932,032

(22) Filed: Feb. 16, 2011

(65) Prior Publication Data

US 2011/0272529 A1     Nov. 10, 2011

Related U.S. Application Data

(60) Provisional application No. 61/342,937, filed on Apr. 22, 2010.

(51) Int. Cl.
    *B64C 23/06*      (2006.01)

(52) U.S. Cl. .................. 244/199.1; 244/198; 244/199.4; 244/201; 244/204; D12/319; D12/325; D12/333; D12/334; D12/314

(58) Field of Classification Search .................. 244/198, 244/199.1, 199.4, 201, 204, 204.1, 213; D12/319, D12/325, 333, 334, 314
See application file for complete search history.

(56) References Cited

U.S. PATENT DOCUMENTS

| | | | | |
|---|---|---|---|---|
| 2,659,178 A * | 11/1953 | Van Hartesveldt | ............. | 446/46 |
| 3,469,804 A * | 9/1969 | Rowan | ......................... | 244/12.2 |
| 3,519,224 A * | 7/1970 | Boyd et al. | ................... | 244/23 R |
| 4,099,687 A * | 7/1978 | Roberts et al. | ................. | 244/7 R |
| 4,284,027 A * | 8/1981 | Montez | ......................... | 114/273 |
| 5,190,242 A * | 3/1993 | Nichols | ......................... | 244/12.2 |
| 5,259,571 A * | 11/1993 | Blazquez | ...................... | 244/12.2 |
| 5,598,990 A * | 2/1997 | Farokhi et al. | ............. | 244/200.1 |
| D382,851 S * | 8/1997 | Knutson et al. | ............... | D12/333 |
| 5,697,468 A * | 12/1997 | Russell et al. | ................. | 180/116 |
| 5,772,155 A * | 6/1998 | Nowak | ......................... | 244/200.1 |
| 5,950,559 A * | 9/1999 | Klem | ............................. | 114/272 |
| 6,186,445 B1 * | 2/2001 | Batcho | ........................... | 244/130 |
| 6,308,913 B1 * | 10/2001 | Fujino et al. | ................. | 244/45 R |
| D475,340 S * | 6/2003 | Arata et al. | ................... | D12/319 |
| 6,749,153 B1 * | 6/2004 | August | ........................... | 244/25 |
| D516,007 S * | 2/2006 | Vigneron et al. | ............ | D12/319 |
| D518,819 S * | 4/2006 | Gray | ............................. | D14/230 |
| 7,461,811 B2 * | 12/2008 | Milde, Jr. | ........................... | 244/9 |
| 7,823,840 B2 * | 11/2010 | Shmilovich et al. | ........... | 244/215 |
| 7,878,458 B2 * | 2/2011 | Shmilovich et al. | ........... | 244/207 |
| 8,087,618 B1 * | 1/2012 | Shmilovich et al. | ........... | 244/215 |
| 8,240,616 B2 * | 8/2012 | Miller et al. | ................... | 244/204 |
| 2006/0011778 A1 * | 1/2006 | Small et al. | ................... | 244/12.2 |
| 2008/0230654 A1 * | 9/2008 | Velicki et al. | .............. | 244/135 R |
| 2010/0140389 A1 * | 6/2010 | Gleed et al. | ................. | 244/12.6 |
| 2011/0001000 A1 * | 1/2011 | Zhu | .............................. | 244/12.1 |

* cited by examiner

*Primary Examiner* — Isam Alsomiri
*Assistant Examiner* — Assres H Woldemaryam

(57) ABSTRACT

A wing assembly has a wing and one or more no-bias laminar flow oval diskettes that are fixed on a support structure along the C/L (center of lift) of an airfoil, of an aircraft wing. The benefit of an oval diskette with laminar flow is that it has no speed limitations and it allows an aircraft to clime at a speed that matches its Ground Effect Lift speed which is a 25% performance increase and a 40% reduction in vortex drag with a increase stability that eliminates inertia coupling of high-speed airfoils.

11 Claims, 7 Drawing Sheets

HAMILTON H.N2 LAMINAR FLOW DISKETTE WING

REFERENCE TO RELATED APPLICATION

This application claims the benefit of U.S. Provisional Application No. 61/342,937, filed Apr. 22, 2010.

BACKGROUND OF INVENTION

1. Field of the Invention

The invention relates to an aircraft wing or a airfoil used to increase the lifting capacity and improve flight performance of an aircraft in takeoff, clime, cruse, and landing with the addition of two or more oval diskettes designed to employ laminar flow technology that will increase lift without additional drag due to wetted area.

2. Discussion of Prior Art

A wing that is high lift is also high drag and to date to have a wing perform at high cruse speed but still provide adequate lift for safe operations at takeoff and landing, a number of slats on the leading edge and a number of flaps on the trailing edge have been employed to give a overall solution to the high lift/high drag problem. Nowak with U.S. Pat. No. 5,772,155, Jun. 30, 1998 and Oulton with U.S. Pat. No. 3,776,491, Dec. 4, 1973 employed preexisting wing form with a delta and a rectangular structure that is designed for high lift and must be retracted back into a wing for cruse flight.

Nowak, U.S. Pat. No. 5,772,155, provides a delta flap on the top of a wing that is deployable from the top surface when the aircraft needs extra lift. Its delta shape is very thin and is to be deflective on the flow separation over the main wing. It is a airflow control device and it must be retracted into the main wing because of it drag implications for cruse flight. Its use is when high lift is required at subsonic speeds and when a wing is stalled. Its primary design is at low speed high angle of attack situations where a potential flow separation on the main wing could occure and a flow director would be useful. The Nowak does not address cruse flight; it is a stall inhibiter design. And this prior art does not use laminar flow, a oval shape with measurable lifting dimensions and a structure for simple attachment to any preexisting wing. It is a wing slat at the rear of wing.

Oulton, U.S. Pat. No. 3,776,491, provides a compound wing that are retracted into the main wing and deployed in a complex mechanical manner to position the compound wing for added lift. This compound wings are traditional wings that conform to the design of the main wing in width and span. Addition of additional wings has long been a problem in the added induced drag that such plane forms bring to a aircraft performance. The compound wing approach applies traditional wing with its measurable lift and measurable drag features. And this prior art does not use laminar flow technology, a oval shape lifting surface and a structure for simple attachment to any preexisting wing.

Prior art in the field of aircraft wing design and its improvement has been most successful with the application of slats on leading edge of wings and flaps on the trailing edge of a wing. Since D. Davis 1937 'Fluid Foil' most aviation design has not made much use of the laminar flow technology because of problems of aluminum construction.

The problem with most wing and airfoil designs is found with the flexing of the skin surface of a wing. This flexing breaks the necessary surface smoothness that is needed to help hold laminar flow air close to the wing skin. To date the control of laminar flow air has been effected by vortex generators, blown flaps, suction and small high drag flaps that are positioned to force air to stay laminar. Most of these devices must be retracted due to high induced drag and will only serve the aircraft at a specific speed. The other penalty that is common among the prior art form is one of complexity of mechanical retraction and the weight that is associated with the addition of slats, flaps, vortex generators, and delta flap generators. This complexity is seen in Lane U.S. Pat. No. 2,275,777 with its wing extension and also in Potoczek U.S. Pat. No. 2,148,962 with its wing extension to increase wing for take off and landings. The drag penalties are well known and the patents like Bugatti U.S. Pat. No. 2,279,615 where designed for takeoff and landing and to be retracted for all other flight conditions.

The important area of concern for aircraft design in wing design and shape of a airfoil is predicated on performance. Early biplanes had great lift but high drag and thus low maximum speed range. Monoplanes had less drag but also less lift and speed was the performance goal. To add a flying surface to a monoplane was to add drag and reduce speed; thus the solution was first the addition of a leading edge slat then a trailing flap and then boundary layer flow control. All these solutions are designed to aid an aircraft that is designed to fly fast and land at a safe speed that reduces the aircraft exposure to stall and spin while in the takeoff or landing approach phase of flight. These devices must be retracted and stowed out of the airstreams while the aircraft is in clime, cruse and decent phase of flight.

In Nowak U.S. Pat. No. 5,772,155 it is noted that as opposed to a trailing or leading edge flap system or slats in use with present aircraft that are deployable attached to the leading or trailing edges; it is proposed to deploy a delta shape flap above a wing to control boundary layer when the aircraft is exposed to a stall. This flap would be retracted as are the other systems of flaps and slats due to their heavy induced drag penalties and not designed to add extra lift; it is designed to maintain the design lift of the wing.

A oval diskette that is designed to make use of laminar flow air for added lift that combines with what is known as favorable interference of multiple lifting airfoils that operate in close proximity is not known in the prior art.

SUMMARY OF THE INVENTION

Accordingly, it is a primary object of the present invention to provide a aircraft airfoil such as a wing or a rotor wing for a helicopter or a airfoil blade for a wind generator with a oval diskette that uses laminar air flow to add additional lift without a increase of induced drag, the oval diskette is static in location and can aid the aircraft at any operating flight speed from takeoff, clime, cruse, descent, and landing approach.

The present invention utilizes an oval diskette shape that is placed above a airfoil at a distance of ½ the oval diskette's width. This is arrived at by knowing the ground effect of aircraft when flown at ½ their wing length above the ground and by knowing of the potential reduction in induced drag due to favorable interference between two wings. A savings of 40% in vortex drag is achieved in aircraft performance when this relationship with flying surfaces is employed. To realize the benefits of the oval diskette placed over a airfoil such as a aircraft wing it is only necessary to insure a 0 to 7 degree positive angle of the oval diskette to the main wings chord.

This simple addition of an oval diskette with a laminar air flow supported above an aircraft wing will increase aircraft performance in all flight regimes. It will allow an aircraft to fly higher and faster than the aircraft is designed for, and there is also a safety factor that the oval diskette provides in its ability to lift in any direction it meets the airflow. It is symmetrical in cross section with a leading edge for its full circumference. Like a Frisbee it can fly in any direction, this allows it to lift a wing of an aircraft when the aircraft wants to stall and spin. By use of one are more oval diskettes along an aircraft airfoil such as a wing or rotor wing, the overall lifting capacity of a aircraft can greatly be improved without changing the performance of a aircraft and requiring no design changes to an aircraft. This would also apply to the blade of an electric wind generator.

DESCRIPTION OF THE PREFERRED EMBODIMENT

Figure 1:
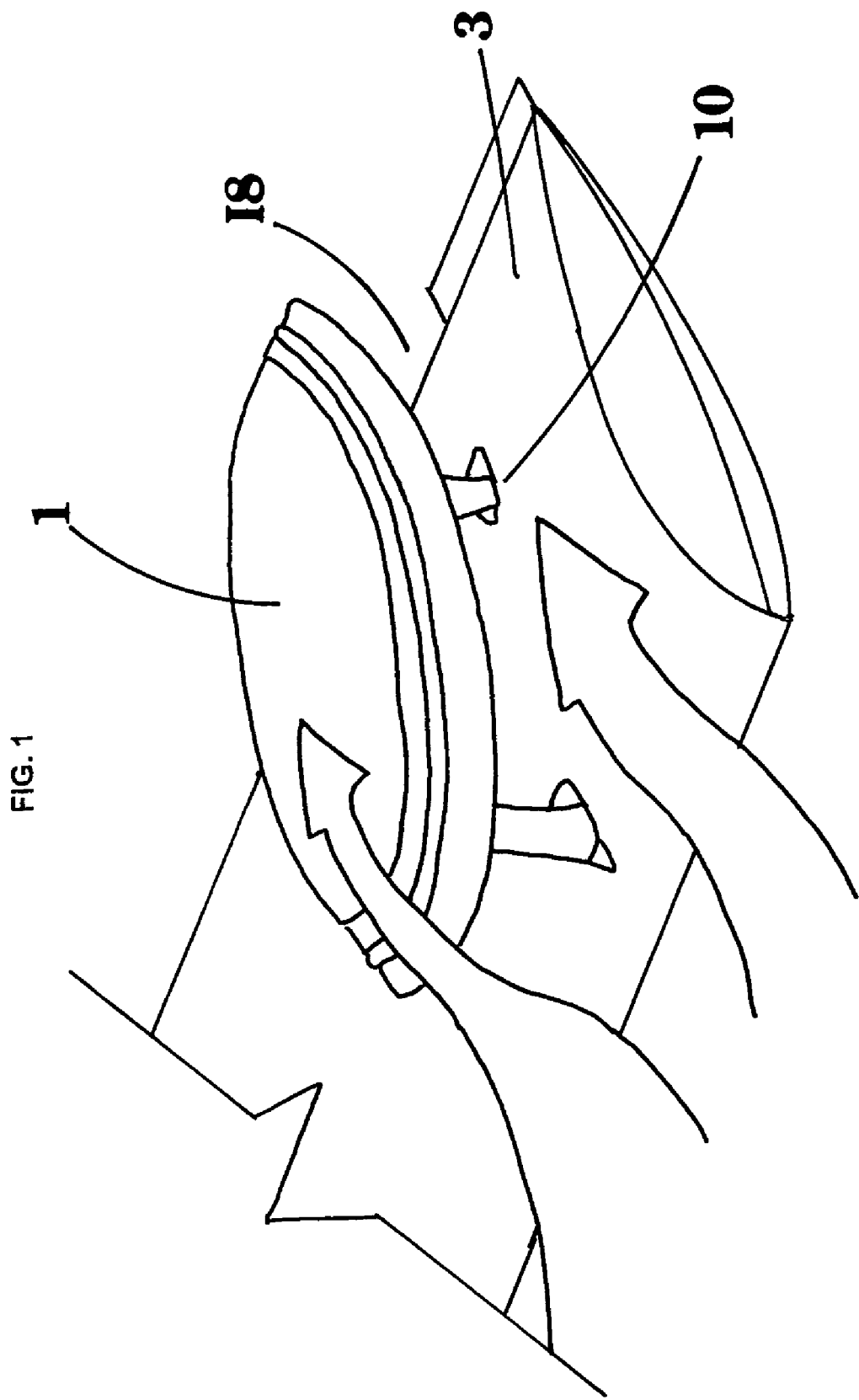
FIG. 1 is a 3-D view of the oval diskette placed over an airfoil with the low pressure air moving over the top of the oval diskette and over the airfoil.

The present invention is illustrated in the referred embodiment in FIG. 1 which depicts a portion of an aircraft airfoil 3 with an oval diskette 1 with the longest length of the diskette pointed toward the air flow direction and the shorter width of the oval diskette is perpendicular to the wing root of the airfoil. The oval diskette is best sited above the airfoil at no greater height than ½ of the width of the oval diskette and the angle of attack of the oval diskette is set between zero and seven degrees of incident to the main airfoil cord. The length of the oval diskette is at a preferred length of the cord of the airfoil that the oval diskette is placed above. The profile of the oval diskettes are thick with a continues leading edge and have no bias along the oval edge as to where lift can develop. The ovals are none moving but the supports are adjustable for Angle of Attack selection.

Figure 2:
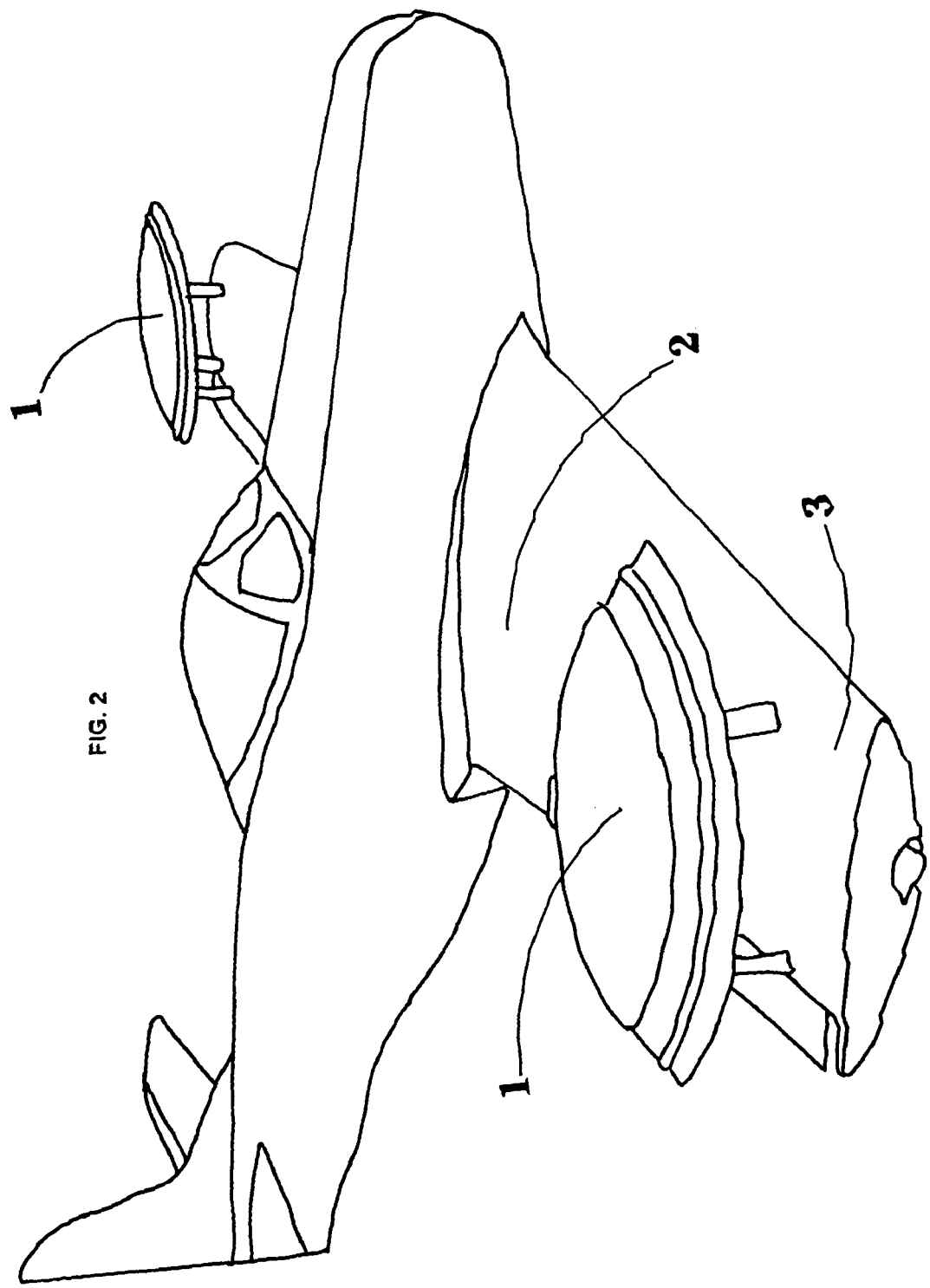
FIG. 2 is a 3-D view of aircraft with oval diskettes placed at wing tips placement this is the optimum placement for favorable interference between lifting airfoils.

If more than one oval diskette are installed on a aircraft wing or airfoil as seen in FIG. 2, then auxiliary positions for the supports 2 will be affixed along the wing root to accommodate added diskettes. During normal flight the diskettes are stationary with not adjustment due to the limited induced drag produced by the diskette.

Figure 3:
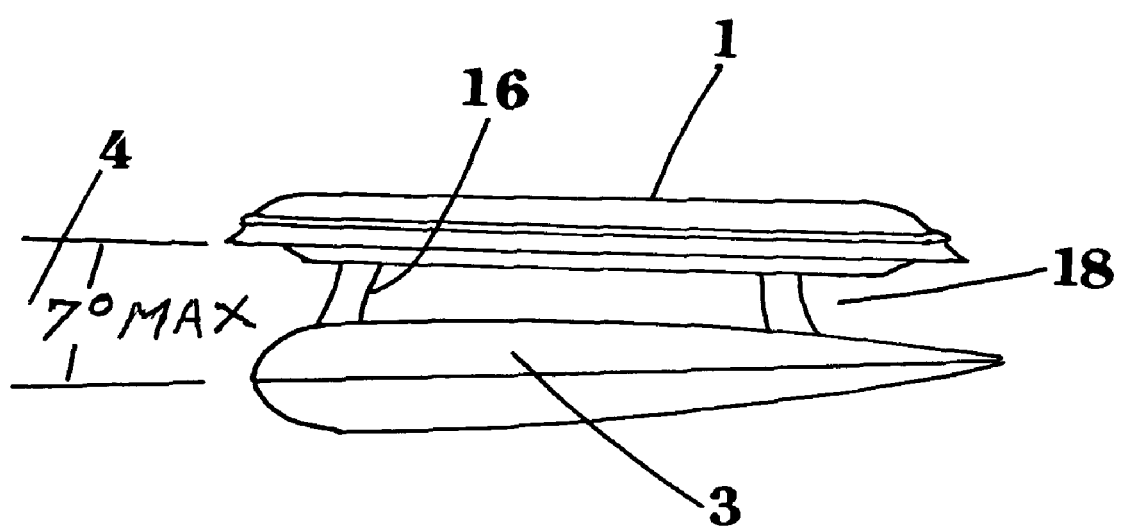
FIG. 3 is a side profile of the oval diskette placement on an airfoil to note the separation space between the oval diskette, and the angle of incidence of the diskette to airfoil chord.
Figure 4:
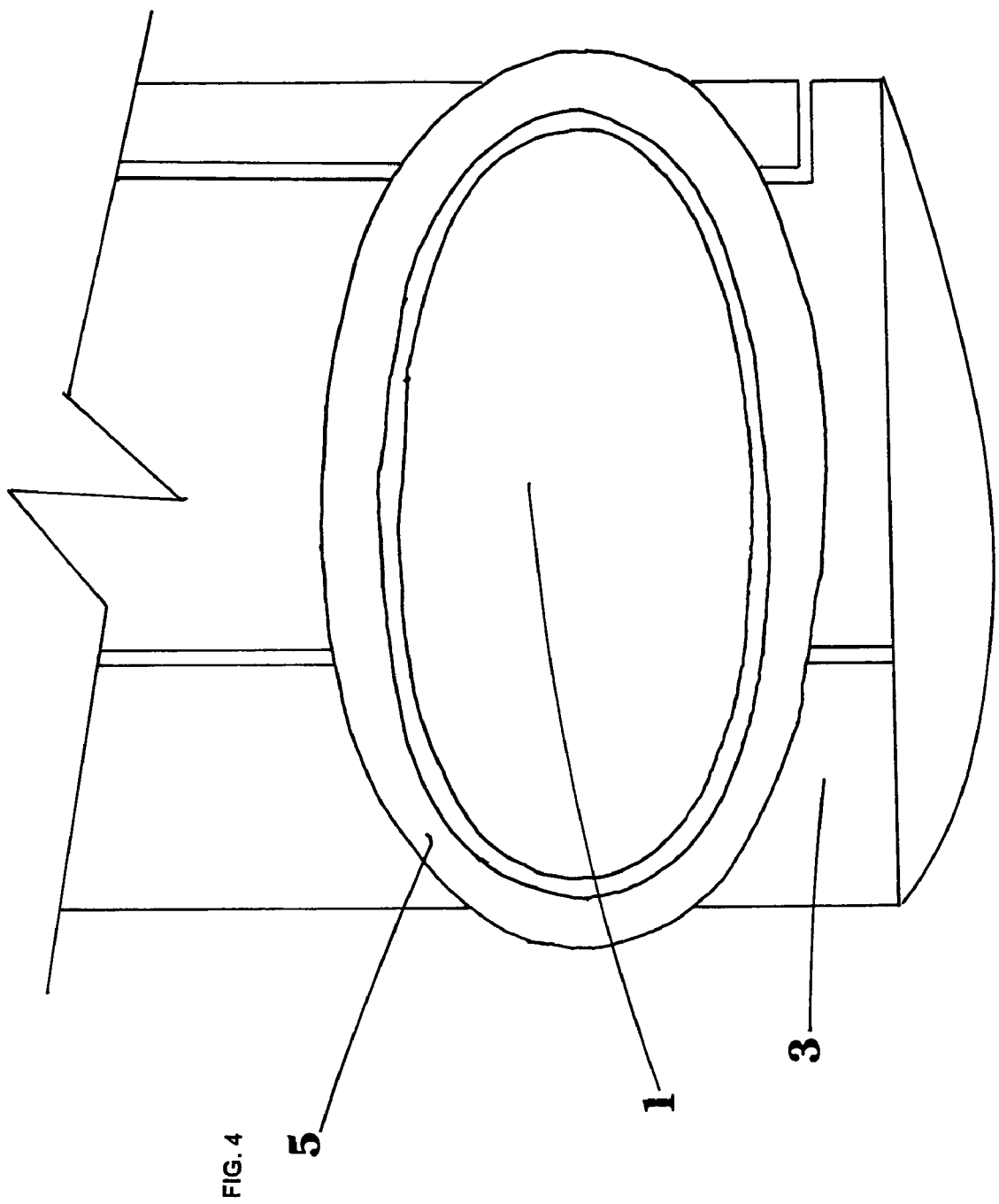
FIG. 4 is a top view looking down on the oval diskettes top plate as the diskette is placed on an aircraft wing; the diskette overhangs the wing's leading edge.

Referring to FIG. 3, each oval diskette rest on three supports which may be adjusted for Angle of Attack from 0 to 7 degrees. The adjustment 16 is along the holes provided in the support legs and allows a selection of position 4 of Angle of Attack to be set. As in FIG. 3, position of the oval diskette is placed above airfoil along the airfoil wing root and situated as in FIG. 4 on the oval diskette 1 is placed with the leading edge 5 in a position that has the leading edge in front of the leading edge of the airfoil. The trailing edge of the oval diskette is near the trailing edge of the airfoil but due to the configuration of the airfoil and its respective aspect ratio, can extend beyond the trailing edge of the oval diskette trailing edge and can be positioned short of the airfoil's trailing edge. Depending on the size of the oval diskette selected as compared to the airfoil configuration, the center of lift of a oval diskette selected as compared to the airfoil configuration, the center of lift of a oval diskette should always be placed over the center of gravity of the airfoil of a aircraft. The oval diskette provides a laminar flow lifting surface that operates best when it is placed as in FIG. 3, at a position above a airfoil with a adequate separation zone 18 that has been determined to be no greater than ½ a distance equal to the width of a oval diskette. This is a distance determined by the nature of a wing flying in ground effect and benefiting from what is known to aerodynamicists as reduction in vortex drag and can be observed in the flocking behavior of many migratory birds or aircraft flying in formation. A graph of potential reduction in induced drag is found in FIG. 8 and is published in the 'Innovation in Aeronautics 2004 AIAA Dryden Lecture'. In FIG. 3 and FIG. 4 is viewed a side profile of a oval diskette and a top profile of a oval diskette in relation to a airfoil of a aircraft with the separation zone 18 in FIG. 3 indication of a close working relationship of two separate lifting airfoils that exhibit a synergy of lift greater than the sum of their parts. The oval diskette is of laminar flow design and is free of the induced drag associated with airfoils of traditional wing configurations with a thick leading edge and a thin trailing edge.

Figure 5:
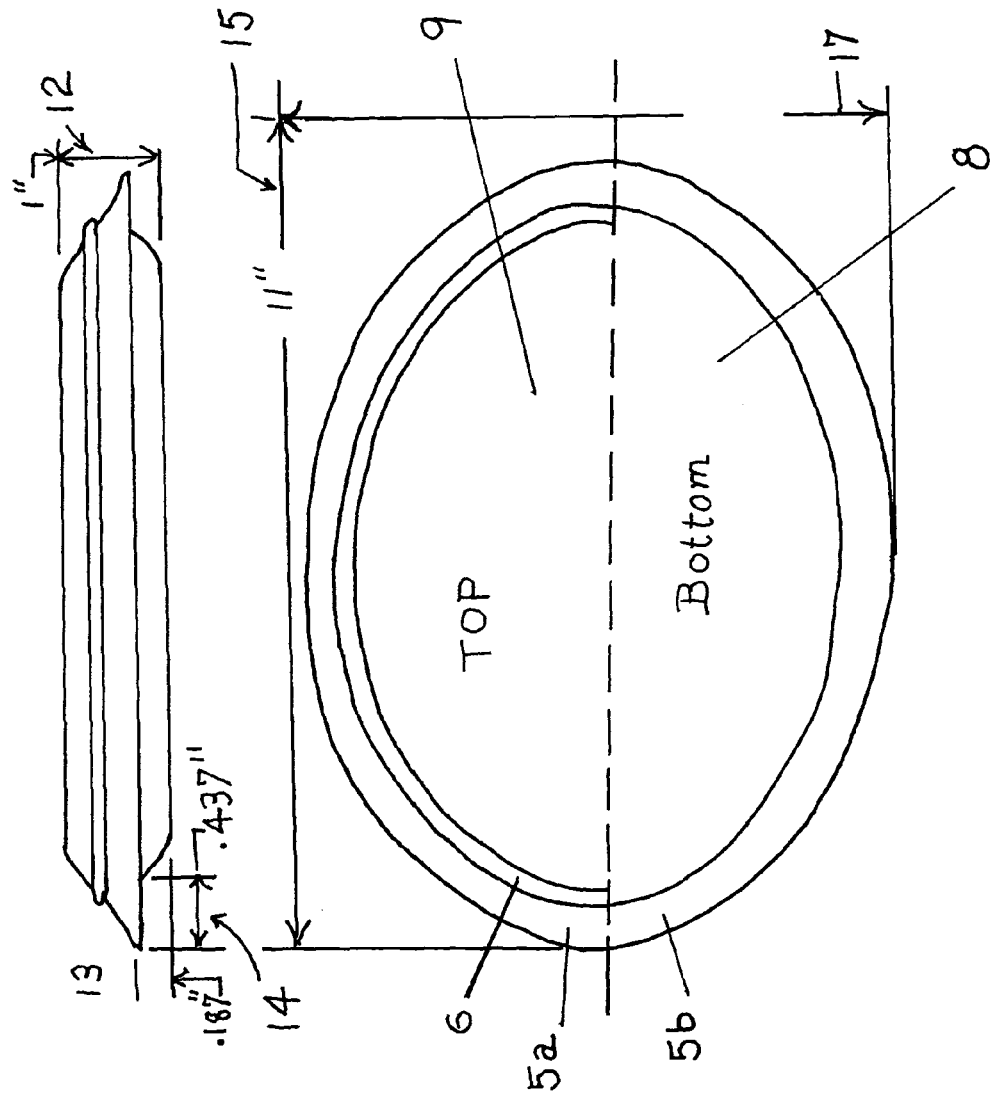
FIG. 5 is a side and top-down view of the oval diskette with measurements taken from a ¼ scale model, note the side view has overhang measurements and the top/down drawing indicates the edge of the larger top plate overhanging the smaller bottom plate.

Referring to FIG. 5 there is a side view and a top view with measurements that are ratios of a preferred embodiment of the oval diskette that are in relationship to a quarter size operating model. When constructing the oval diskette it is necessary to employ such ratios when matching an oval diskette to an airfoil. The length of the oval diskette is at 15 and is a measurement of 11 inches and at 17 is a measurement of 8.75 inches for a ¼ scale model; however, for a full scale model with a length of 60 inches at 15 the corresponding width would be 47 inches at 17 on FIG. 5. When constructing a ¼ scale to large scale it is important to insure the leading edge overhang found at 14 is uniform in size in the circumference of the oval diskette and its shape is gently sloped. With a smooth top surface found at 5a but a waffled surface on the bottom side of the leading edge overhang found at 5b. The leading edge overhang at 5a can be seen as a continuous skirting of equal size and shape that gives the oval diskette its unique non-bias lifting profile with a symmetrical shape of its cross-section. The best laminar flow is developed when the bottom plate 8 in FIG. 5 is attached to the top plate at the ridge bulge at 6 developing a side profile that allows the bottom plate to hang below the line of the leading edge overhang. A ¼ scale model is best with a 0.187 inch as found at 13 in FIG. 5 for a model of 11 inches long and a height of 1 inch as found at 12 . A scaled up size would require the same relationship.

Figure 6:
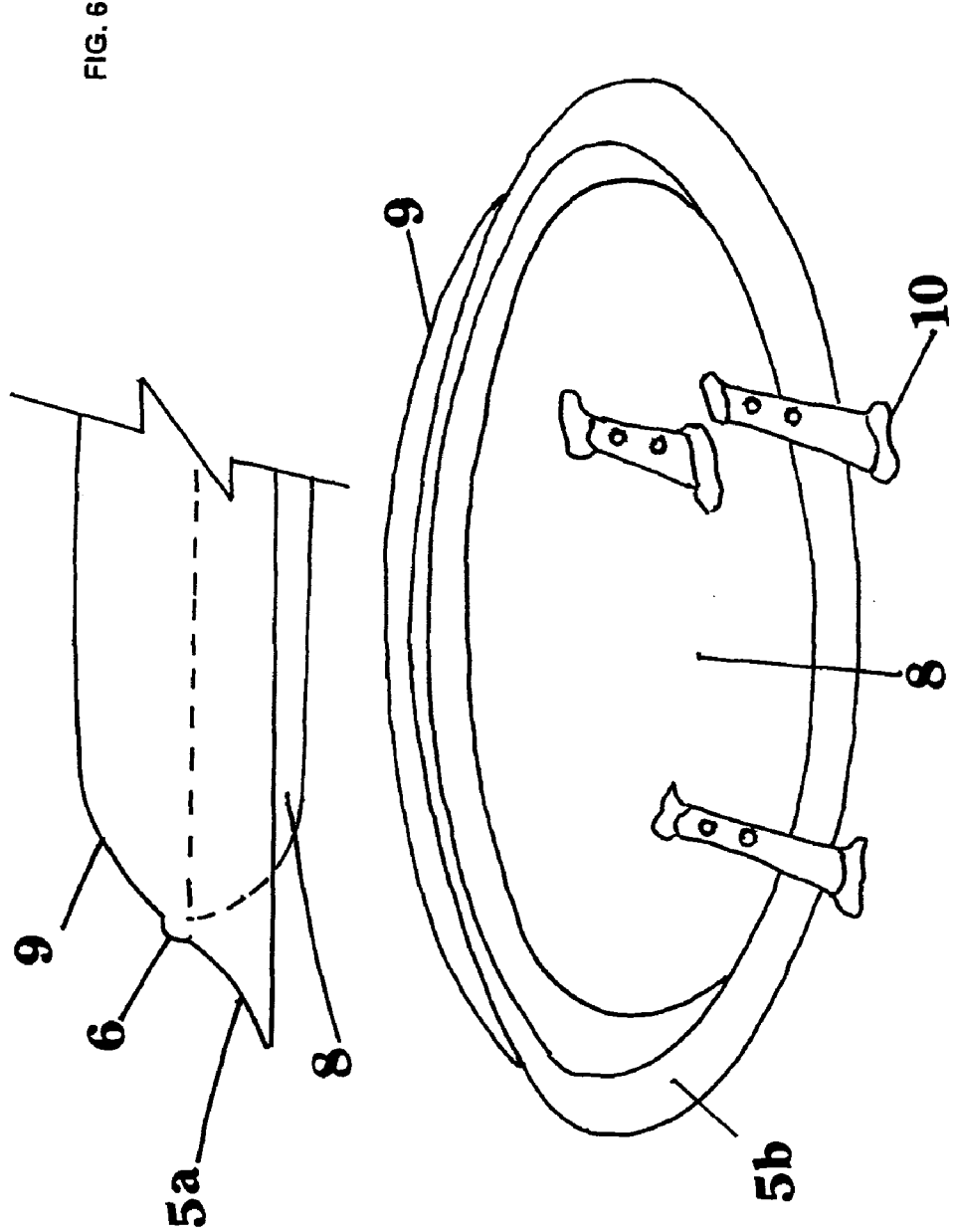
FIG. 6 is a three dimensional view of the larger top plate with the dotted line of the bottom plate as it is bonded to the ridge line of the top plate, and a bottom view of the overhanging edge of the top plate as it forms a skirt around the bottom plate.

Referring to FIG. 6 the leading edge overhang is profiled in a 3-D dimensional cross section to better define the relationship of the bottom plate 8 to the top plate 9 and how the leading edge forms a continuous skirt around the bottom of the oval diskette but because the bottom plate 8 is higher than the leading edge 5a is wide, the bottom plate 8 will hang below the edge as seen at 5b on FIG. 6. This shape has demonstrated at ¼ scale to develop laminar flow in both longitudinal and lateral airflows. The ridge bulge at 6 is an important structural device for it provides a bonding line for the top plate 9 to the bottom plate 8 and has a stiffening effect for the structure.

Figure 7:
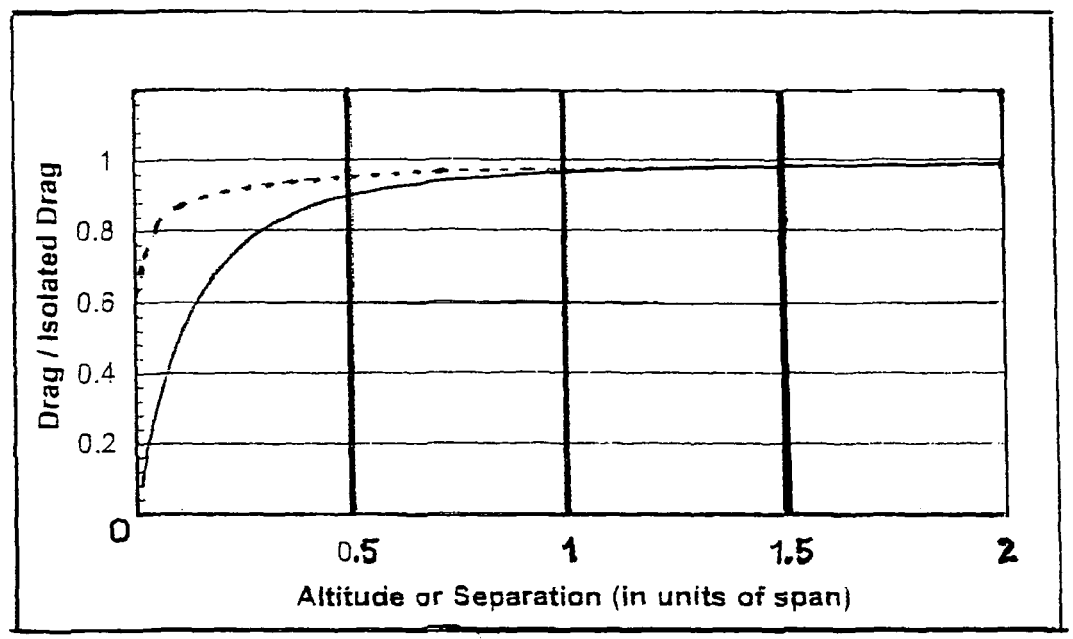
FIG. 7 is a Graph of Ground Effect and Formation Flight Effect relating the advantages of both for aircraft that operate in this flight condition.

Referring to FIG. 7 is a supporting document to the important relationship for multiple flying surfaces when in close proximity as is presented in FIG. 1 where a oval diskette is placed over an airfoil 3 at a distance of ½ the width of the diskette and is supported by the legs 10. The graph of potential reduction in induced drag due to favorable interference between two wings is illustrated by the flocking behavior of many migratory birds and is well-known to aerodynamicists and pilots. In the AIAA Dryden Lecture of 2004 found at internet site {aero,stanford.edu./report/aiaa200400016} PDF the graph is used to compare the values of an aircraft flying in ground effect with the value of an aircraft flying in formation. These values are graphed at about a 40% reduction of vortex drag.

What is claimed:

1. A laminar flow oval diskette flight assembly comprising: an oval diskette with a top surface bonded to a bottom surface that when suspended over the top of an aircraft wing along the center of gravity of an aircraft, having the said aircraft lifting surface, said oval diskette is suspended in a length wise direction with the apex of the oval diskette facing the direction of flight of the aircraft and overhang on the leading edge of the aircraft wing and with the long sides of the oval diskette parallel to direction of flight of the aircraft and the tail of the oval diskette positioned near the trailing edge of the aircraft wing.

2. A laminar flow oval diskette flight assembly as recited in claim 1, where the upper surface of the oval diskette comprising a convex dome that is larger than the bottom surface of the oval diskette that is comprising a convex dome that when bonded together will have an overhanging lip formed by the leading edge of the top dome that extends to form a skirt around the bottom dome.

3. A laminar flow oval diskette flight assembly as recited in claim 1, where the top and bottom surfaces of the oval diskette are comprised of entirely carbon fiber material and bonded with a resin in cold or thermal manner which provides a smooth and nonflexible structure.

4. A laminar flow oval diskette flight assembly as recited in claim 1, where the oval diskette is suspended over the top of the aircraft wing by a set of three legs or pylons that can be set from 0 to 7 degrees of incidence to the chord of the wing or airfoil it is placed upon.

5. A laminar flow oval diskette flight assembly as recited in claim 1, where a plurality of oval diskettes can be place along the center of lift of a wing or an airfoil.

6. A laminar flow oval diskette flight assembly as recited in claim 1, the size of the oval diskette is in ratio to size of airfoil so as the leading apex of the oval diskette overhang the leading edge of the airfoil and trailing tail of said oval diskette in near the trailing edge of the airfoil.

7. A laminar flow oval diskette flight assembly as recited in claim 1, wherein the dimensions and curves develop an oval shape that has an overhanging edge that is in circumference around the oval diskette and present an equal cross-section in any radius from the center of the oval diskette; said shape will generate a lifting event in any direction the oval diskette is moved.

8. A laminar flow oval diskette flight assembly as recited in claim 1, wherein the oval diskette is placed at no greater height above the aircraft wing or airfoil as to be more than ½ the length of the oval diskette's longest side, the placement will benefit from a potential reduction in induced drag due to favorable interference between two aircraft wings.

9. A laminar flow oval diskette flight assembly as recited in claim 1, wherein the oval diskette's center of lift is aligned with the center of lift of the aircraft wing and a positive balance will be established between the lifting surfaces that significantly increase aircraft lift at a greater rate than drag.

10. A laminar flow oval diskette flight assembly as recited in claim 1, wherein the oval diskette is adapted to an airfoil size in that the dimensional form of the oval diskette should not appreciably be altered when sizing the oval diskette to fit a lifting surface such as a wing of an aircraft or a rotor blade of a vertical lift aircraft or the blade of a wind generator. The parameters must be determined for each airfoil with the aspect ratio as a primary determinate of the size of the oval diskette which will insure a reduction in vortex drag.

11. A laminar flow oval diskette flight assembly as recited in claim 4, wherein the center of lift of the laminar flow oval diskette flight assembly along with the 0 to 7degree adjustment in the incidence to the aircraft wing can be altered to change the aircraft trim and lift performance.

\* \* \* \* \*